United States Patent
Kobayashi

(10) Patent No.: US 8,182,352 B2
(45) Date of Patent: May 22, 2012

(54) CONSTANT VELOCITY UNIVERSAL JOINT

(75) Inventor: Masazumi Kobayashi, Iwata (JP)

(73) Assignee: NTN Corporation, Osaka (JP)

( * ) Notice: Subject to any disclaimer, the term of this patent is extended or adjusted under 35 U.S.C. 154(b) by 344 days.

(21) Appl. No.: 12/529,743

(22) PCT Filed: Feb. 22, 2008

(86) PCT No.: PCT/JP2008/053015
§ 371 (c)(1),
(2), (4) Date: Sep. 3, 2009

(87) PCT Pub. No.: WO2008/114574
PCT Pub. Date: Sep. 25, 2008

(65) Prior Publication Data
US 2010/0113168 A1    May 6, 2010

(30) Foreign Application Priority Data

Mar. 20, 2007 (JP) .................. 2007-073461

(51) Int. Cl.
*F16D 3/224* (2011.01)
(52) U.S. Cl. ....................... 464/145; 464/905
(58) Field of Classification Search .................. 464/15, 464/140–146, 906
See application file for complete search history.

(56) References Cited

U.S. PATENT DOCUMENTS

| | | | |
|---|---|---|---|
| 4,820,240 A * | 4/1989 | Girguis | 464/145 |
| 2008/0096678 A1 | 4/2008 | Yamazaki et al. | |

FOREIGN PATENT DOCUMENTS

| | | |
|---|---|---|
| CN | 1864013 A | 11/2006 |
| EP | 1 669 622 | 6/2006 |
| JP | 03-061722 | 3/1991 |
| JP | 11-190354 | 7/1999 |
| JP | 2002-013544 | 1/2002 |
| JP | 2005-221033 | 8/2005 |

OTHER PUBLICATIONS

International Preliminary Report on Patentability and Written Opinion of the International Searching Authority dated Oct. 1, 2009 for International Application No. PCT/JP2008/053015.
Chinese Office Action issued May 9, 2011 in corresponding Chinese Application No. 200880008546.4 with English translation.
International Search Report dated Mar. 18, 2008 for International Application No. PCT/JP2008/053015.

* cited by examiner

*Primary Examiner* — Gregory Binda
(74) *Attorney, Agent, or Firm* — Wenderoth, Lind & Ponack, L.L.P.

(57) ABSTRACT

A constant velocity universal joint smoothly rotates under a high operating angle and large torque and reduces an excessive load applied to the cage. The universal joint includes an outer joint member having an inner spherical surface with multiple track grooves and an inner joint member having an outer spherical surface with multiple track grooves paired with the track grooves of the outer joint member. The universal joint also includes multiple balls interposed between the track grooves of the inner and outer joint members to transmit torque and a cage interposed between the outer joint member and the inner joint member to retain the balls. A tapered relief portion retracted with respect to the outer spherical surface is formed with low curvature at a back end portion of the outer spherical surface of the inner joint member to be smoothly continuous with the outer spherical surface.

2 Claims, 2 Drawing Sheets

CONSTANT VELOCITY UNIVERSAL JOINT

TECHNICAL FIELD

The present invention relates to a constant velocity universal joint, and more specifically, to a fixed type constant velocity universal joint to be used in power transmission systems of automobiles and various kinds of industrial machines, which only allows an operating angle displacement between a shaft on the power-transmitting side and a shaft on the driven side.

BACKGROUND ART

For example, a fixed type constant velocity universal joint (Rzeppa constant velocity universal joint: BJ) used for the connection between drive shafts or the like in automobiles includes: an outer joint member in which curved track grooves are axially formed on its inner surface with a spherical shape; an inner joint member in which curved track grooves are axially formed on its outer surface with a spherical shape; multiple torque transmission balls respectively arranged in ball tracks formed by cooperation of the track grooves of the inner joint member and the track grooves of the outer joint members corresponding thereto; and a retainer (cage) having pockets for respectively holding those torque transmission balls.

Further, there may be cases where a wheel base is lengthened from the viewpoint of improving the safety of automobile in the event of a crash. In this case, however, in order to prevent a turning radius of the vehicle from increasing, there is a need to increase a steering angle for the front wheels by providing the fixed type constant velocity universal joint with a higher operating angle. For filling the need for such a higher-angle, there is provided an undercut-free type fixed constant velocity universal joint (UJ) in which the track grooves on the opening side of the outer joint member have a straight shape parallel to the axial direction of the joint. In this kind of constant velocity universal joint, there is no under cut formed on either of the outer joint member or the inner joint member so that a higher operating angle can be attained.

Examples of the fixed type constant velocity universal joint in recent years include one having a retainer (cage) increased in strength and durability (Patent Document 1), and one prevented from operational failures liable to occur when a high operating angle is formed and large torque is born (Patent Document 2).

Examples of the fixed type constant velocity universal joint in recent years include one having a retainer (cage) increased in strength and durability (Patent Document 1), and one prevented from operational failures liable to occur when a high operating angle is formed and large torque is born (Patent Document 2).

In the constant velocity universal joint disclosed in Patent Document 1, a dimensional relation between curvature radius of corner radius portions and diameter of torque transmission balls are set in cage pockets. With this setting, surface areas of an inner surface and an outer surface of a retainer (cage) are increased. With this increase and an effect of a decrease in maximum main stress load in pole portions between pockets adjacent to each other in a circumferential direction, the cage can be increased in strength and durability.

Incidentally, in the fixed type constant velocity universal joint of those types, track grooves in the inner race are formed to be deeper at one end portions (inlet side) and shallower at the other end portions (back side). Therefore, there is a risk that, in the vicinity of the shallower end portion at which the torque transmission balls are positioned when a high operating angle is formed, contact ellipses of the torque transmission balls run onto shoulder portions of the track grooves so as to cause failures such as cracking or swelling of edge portions. Under the circumstance, in the fixed type constant velocity universal joint disclosed in Patent Document 2, a relief portion is provided on an outer spherical surface on a side of the inner race (back side), on which the track grooves are shallower, while being retracted with respect to the outer spherical surface. With this, even when swelling and the like occur, the relief portion absorbs the swelling and the like so as to prevent operational failures from occurring.

(Patent Document 1) JP 2002-13544 A
(Patent Document 2) JP 11-190354 A

SUMMARY OF THE INVENTION

Problem to be Solved by the Invention

However, in Patent Document 1, even though the dimensional relation between the curvature radius of the corner radius portions and the diameter of the torque transmission balls are set, there is a risk that the cage suffers breakage at an early stage when a high operating angle is formed and large load is applied. That is, when the constant velocity universal joint forms a high operating angle and is rotated while bearing large torque, a spherical force is generated between the inner race and the cage and between the cage and the outer race. By the spherical force, the inner race comes into contact with the inner surface of the cage with a high contact force. When a high operating angle is formed, the edge portions on the back side end surface of the inner race are rotated in a direction of biting into the cage inner surface. Therefore, smooth rotation cannot be achieved so that excessive load is applied to the cage. With this, there is a risk that the cage suffers breakage at an early stage when a high operating angle is formed and large load is applied.

Further, as described in Patent Document 2, even when the relief portion is formed on the back side of the inner race, the edge portions are formed on the end surface of the back side of the inner race. Thus, in this case also, there is a risk that the edge portions bite into the cage inner surface when a high operating angle is formed.

In order to solve the above-mentioned problems, the present invention provides a constant velocity universal joint capable of being smoothly rotated even when a high operating angle is formed and large torque is born and of reducing excessive load applied to the cage so as to strengthen the cage.

Means for Solving the Problems

A constant velocity universal joint according to the present invention comprises: an outer joint member having an inner spherical surface in which multiple track grooves are formed; an inner joint member having an outer spherical surface in which multiple track grooves paired with the track grooves of the outer joint member are formed; multiple balls interposed between the track grooves of the outer joint member and the track grooves of the inner joint member so as to transmit torque; and a cage interposed between the inner spherical surface of the outer joint member and the outer spherical surface of the inner joint member so as to retain the balls. In the constant velocity universal joint, a tapered relief portion retracted with respect to the outer spherical surface is formed with low curvature at a back end portion of the outer spherical surface of the inner joint member so as to be smoothly continuous with the outer spherical surface.

In the constant velocity universal joint of the present invention, the relief portion is formed at the back end portion of the outer spherical surface of the inner joint member. With this, it is possible to eliminate biting into the cage inner surface of the back end portion of the inner joint member.

The relief portion is preferably provided within a range of 3 mm or less measured from a back end surface of the inner joint member. Further, the multiple balls may comprise five to eight balls.

Effects of the Invention

According to the constant velocity universal joint of the present invention, it is possible to eliminate biting into the cage inner surface of the back end portion of the inner joint member. With this, it is possible to achieve smooth rotation so as to reduce excessive load applied to the cage, to thereby strengthen the cage.

By setting a range of the relief portion to be 3 mm or less when measured from the back end surface of the inner joint member, it is possible to effectively secure the contact area between the inner joint member and the cage. With this, surface pressure between the inner joint member and the cage can be reduced so as to suppress generation of heat, whereby life of the constant velocity universal joint can be increased. When the relief portion is excessively large, the contact area between the inner joint member and the cage is reduced. As a result, the surface pressure between the inner joint member and the cage becomes higher so that generation of heat is increased, which leads to a risk of a decrease in life of the constant velocity universal joint.

Further, five to eight torque transmission balls can be used. In particular, by being provided with the eight torque transmission balls, the constant velocity universal joint can be further compacted and reduced in weight while strength, load capacity, and durability thereof are secured.

Figure 1:
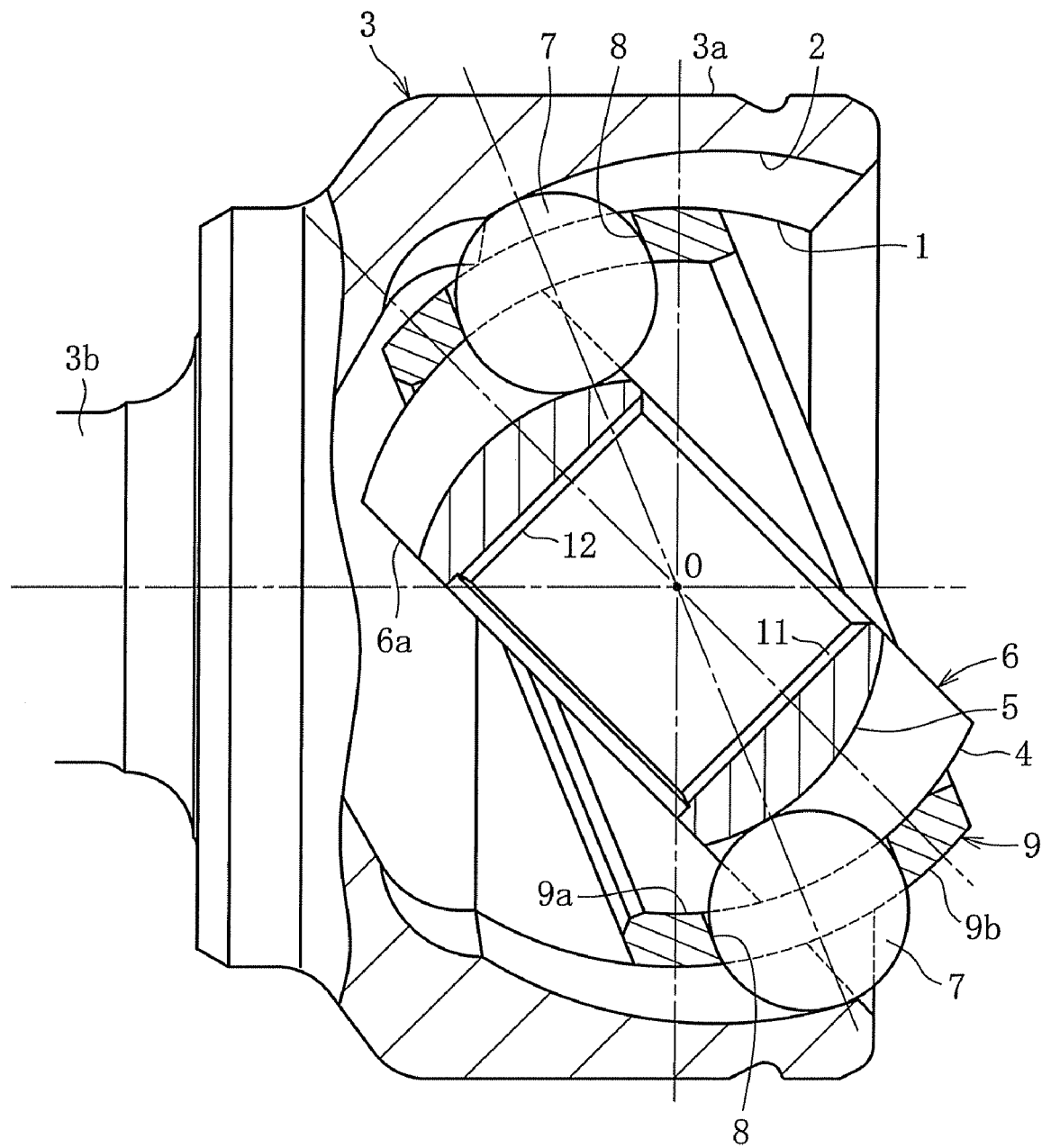
FIG. 1 is a sectional view of a constant velocity universal joint according to an embodiment of the present invention.

DESCRIPTION OF SYMBOLS 1 inner spherical surface
2 track groove
4 outer spherical surface
5 track groove
6 inner race
7 torque transmission ball
9 retainer (cage)
15 end portion
17 relief portion

DETAILED DESCRIPTION OF THE INVENTION

In the following, an embodiment of the present invention is described with reference to FIGS. 1 to 3.

FIG. 1 illustrates a constant velocity universal joint (Rzeppa type constant velocity universal joint: BJ). The constant velocity universal joint is constituted by an outer race 3 serving as an outer joint member having an inner spherical surface 1 in which curved track grooves 2 are formed in an axial direction, an inner race 6 serving as an inner joint member having an outer spherical surface 4 in which curved track grooves 5 are formed in the axial direction, multiple torque transmission balls 7 arranged in ball tracks formed by cooperation of the track grooves 2 of the outer race 3 and the track grooves 5 of the inner race 6 corresponding thereto, and a retainer (cage) 9 provided with pockets 8 for retaining the torque transmission balls 7.

The inner race 6 is subjected to spline fitting in which a shaft (not shown) is inserted into a center hole (inner hole) thereof, and the spline fitting enables torque transmission therebetween. Thus, a spline portion 12 is formed on an inner surface 11 of the inner joint member (inner race) 6. Further, the outer race 3 is constituted by a mouth portion 3a in which the track grooves 2 are formed and a stem portion 3b protruding from a bottom wall of the mouth portion 3a.

Figure 2:
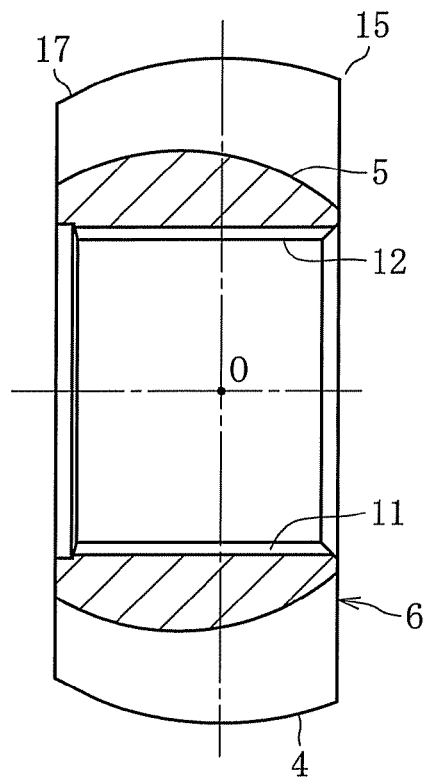
FIG. 2 is a sectional view of an inner race of the constant velocity universal joint.
Figure 3:
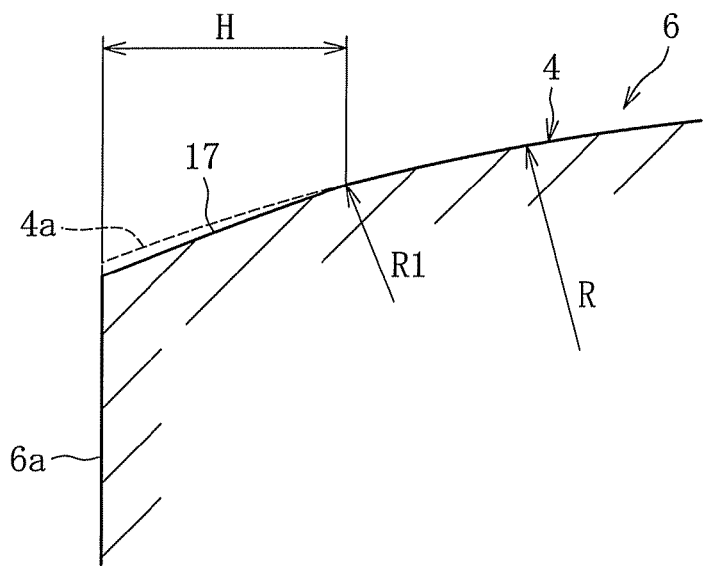
FIG. 3 is a sectional view of a main portion of the inner race of the constant velocity universal joint.

As illustrated in FIG. 2, at a back end portion 4a of the outer spherical surface 4 of the inner race 6, there is formed a tapered relief portion 17 retracted with respect to the outer spherical surface 4 of curvature radius R. The outer spherical surface 4 and the tapered relief portion 17 are formed with curvature radius R1 smaller than the curvature radius R of the outer spherical surface 4 so as to be smoothly continuous with each other. Thus, the outer spherical surface 4 is retracted to a radially inner side with respect to the back end portion 4a (a range defined by an imaginary line illustrated in FIG. 3) in the case where the relief portion 17 is not provided. Further, it is preferable that a range H of the relief portion 17 (range from back end surface 6a of inner race 6 to an intersection of tapered relief portion 17 and outer spherical surface 4) be set to be 3 mm or less.

Curvature radius of an inner surface 9a of the cage 9 and the curvature radius R of the outer spherical surface 4 of the inner race 6 are set to be substantially equal to each other, and curvature radius of an outer surface 9b of the cage 9 and curvature radius of the inner spherical surface 1 of the outer race 3 are set to be substantially equal to each other. Thus, when an operating angle is formed, the outer surface 9b of the cage 9 slides on the inner spherical surface 1 of the outer race 3, and the outer spherical surface 4 of the inner race 6 slides on the inner surface 9a of the cage 9.

In the present invention, the relief portion 17 is provided at the back end portion of the outer spherical surface 4 of the inner race 6 serving as an inner joint member, whereby it is possible to eliminate biting of the back end portion of the inner race 6 into the cage inner surface 9a. With this, it is possible to achieve smooth rotation so as to reduce excessive load to the cage 9. As a result, the cage 9 can be strengthened.

By setting the range H of the relief portion 17 to be 3 mm or less when measured from the back end surface of the inner race 6, it is possible to effectively secure the contact area between the inner race 6 and the cage 9. With this, surface pressure between the inner race 6 and the cage 9 can be reduced so as to suppress generation of heat, whereby life of the constant velocity universal joint can be increased. When the relief portion 17 is excessively large, the contact area between the inner race 6 and the cage 9 are reduced. As a result, the surface pressure between the inner race 6 and the cage 9 becomes higher so that generation of heat is increased, which leads to a risk of a decrease in life of the constant velocity universal joint. Note that, when the relief portion 17 is excessively small, the relief portion 17 cannot exert the function thereas. Thus, it is preferable that the range H of the relief portion 17 be set to be 0.5 mm or more.

Incidentally, in the constant velocity universal joint, five to eight torque transmission balls 7 can be used. In particular, by being provided with the eight torque transmission balls 7, the constant velocity universal joint can be further compactified and reduced in weight while strength, load capacity, and durability thereof are secured.

Industrial Applicability

The present invention is also applicable to a fixed type constant velocity universal joint (UJ) of undercut free type in which the track grooves on an opening side of the outer joint member have a straight shape parallel to the axial direction.

The invention claimed is:

1. A constant velocity universal joint, comprising:
   an outer joint member having an inner spherical surface in which a plurality of track grooves are formed;
   an inner joint member having an outer spherical surface in which a plurality of track grooves paired with the track grooves of the outer joint member are formed;
   a plurality of balls interposed between the track grooves of the outer joint member and the track grooves of the inner joint member so as to transmit torque; and
   a cage interposed between the inner spherical surface of the outer joint member and the outer spherical surface of the inner joint member so as to retain the balls,
   wherein a curvature radius of an inner diameter surface of the cage and a curvature radius of the outer spherical surface of the inner joint member are substantially equal to each other, and
   wherein a tapered relief portion retracted with respect to the outer spherical surface is formed with low curvature with a range of 0.5 mm or more and 3 mm or less from a back end surface of the outer spherical surface of the inner joint member so as to be smoothly continuous with the outer spherical surface.

2. A constant velocity universal joint according to claim 1, wherein the plurality of balls is five to eight balls.

* * * * *